United States Patent
Itoda

(10) Patent No.: US 11,558,219 B2
(45) Date of Patent: Jan. 17, 2023

(54) RELAY DEVICE

(71) Applicant: DENSO CORPORATION, Kariya (JP)

(72) Inventor: Shuhei Itoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/198,065

(22) Filed: Mar. 10, 2021

(65) Prior Publication Data

US 2021/0194727 A1 Jun. 24, 2021

Related U.S. Application Data

(63) Continuation of application No. PCT/JP2019/033486, filed on Aug. 27, 2019.

(30) Foreign Application Priority Data

Sep. 12, 2018 (JP) .............................. JP2018-170859

(51) Int. Cl.
*H04L 12/46* (2006.01)
*H04L 12/44* (2006.01)

(52) U.S. Cl.
CPC .......... *H04L 12/4625* (2013.01); *H04L 12/44* (2013.01)

(58) Field of Classification Search
None
See application file for complete search history.

(56) References Cited

U.S. PATENT DOCUMENTS

| | | |
|---|---|---|
| 6,332,198 B1 | 12/2001 | Simons et al. |
| 6,639,910 B1 | 10/2003 | Provencher et al. |
| 6,654,903 B1 | 11/2003 | Sullivan, Jr. et al. |
| 6,658,579 B1 | 12/2003 | Bell et al. |
| 6,658,580 B1 | 12/2003 | Bell et al. |
| 6,760,339 B1 | 7/2004 | Noel et al. |
| 6,868,092 B1 | 3/2005 | Bell et al. |
| 6,876,652 B1 | 4/2005 | Bell et al. |
| 6,930,890 B1 | 8/2005 | Branscomb |
| 6,934,749 B1 | 8/2005 | Black et al. |
| 7,020,696 B1 | 3/2006 | Perry et al. |
| 7,023,845 B1 | 4/2006 | Simons et al. |
| 7,039,046 B1 | 5/2006 | Simons et al. |

(Continued)

FOREIGN PATENT DOCUMENTS

| | | |
|---|---|---|
| JP | 2003534748 A | 11/2003 |
| JP | 2006217288 A | 8/2006 |

(Continued)

*Primary Examiner* — Lonnie V Sweet

(74) *Attorney, Agent, or Firm* — Harness, Dickey & Pierce, P.L.C.

(57) ABSTRACT

A relay device includes a plurality of ports, a medium access control unit, and a relay processing unit. Each of the plurality of ports provides a physical layer. The medium access control unit is connected to the plurality of ports. The medium access control unit receives a communication frame from one port out of the plurality of ports. The medium access control unit transmits the communication frame to another port out of the plurality of ports. The relay processing unit transmits, in cooperation with the medium access control unit and through the medium access control unit, the communication frame received from the medium access control unit to another port that corresponds to destination information included in the communication frame.

11 Claims, 6 Drawing Sheets

(56) References Cited

U.S. PATENT DOCUMENTS

| | | | |
|---|---|---|---|
| 7,054,272 B1 | 5/2006 | Noel et al. | |
| 7,062,642 B1 | 6/2006 | Langrind et al. | |
| 7,111,053 B1 | 9/2006 | Black et al. | |
| 7,130,870 B1 | 10/2006 | Pecina et al. | |
| 7,143,153 B1 | 11/2006 | Black et al. | |
| 7,222,147 B1 | 5/2007 | Black et al. | |
| 7,240,364 B1 | 7/2007 | Branscomb et al. | |
| 7,266,595 B1 | 9/2007 | Black et al. | |
| 7,280,529 B1 | 10/2007 | Black et al. | |
| 7,349,960 B1 | 3/2008 | Pothier et al. | |
| 10,587,514 B1* | 3/2020 | Singh | H04L 45/745 |
| 2002/0001307 A1 | 1/2002 | Nguyen et al. | |
| 2002/0057018 A1 | 5/2002 | Branscomb et al. | |
| 2002/0116485 A1 | 8/2002 | Slack et al. | |
| 2002/0118031 A1 | 8/2002 | Sweeney et al. | |
| 2002/0165961 A1 | 11/2002 | Everdell et al. | |
| 2003/0120822 A1 | 6/2003 | Langrind et al. | |
| 2003/0126195 A1 | 7/2003 | Reynolds et al. | |
| 2004/0031030 A1 | 2/2004 | Kidder et al. | |
| 2005/0198247 A1 | 9/2005 | Perry et al. | |
| 2006/0171385 A1 | 8/2006 | Itou et al. | |
| 2008/0144629 A1* | 6/2008 | Tomiyasu | H04L 47/724 370/392 |
| 2013/0182720 A1* | 7/2013 | Matsuike | G06F 13/385 370/476 |
| 2014/0086067 A1 | 3/2014 | Yamamori | |
| 2014/0298076 A1* | 10/2014 | Kanayama | G06F 11/0775 714/2 |
| 2020/0106704 A1* | 4/2020 | Iwata | H04L 45/72 |

FOREIGN PATENT DOCUMENTS

| | | |
|---|---|---|
| JP | 2014068079 A | 4/2014 |
| JP | 2016141269 A | 8/2016 |

* cited by examiner

RELAY DEVICE

CROSS REFERENCE TO RELATED APPLICATIONS

The present application is a continuation application of International Patent Application No. PCT/JP2019/033486 filed on Aug. 27, 2019, which designated the U.S. and claims the benefit of priority from Japanese Patent Application No. 2018-170859 filed on Sep. 12, 2018. The entire disclosures of all of the above applications are incorporated herein by reference.

TECHNICAL FIELD

The present disclosure relates to a relay device constituting a communication network in a vehicle.

BACKGROUND

An in-vehicle communication network with a relay device has been proposed. The relay device includes a plurality of ports, and relays a signal input to one port to another port determined by a destination included in the input signal.

SUMMARY

The present disclosure provides a relay device. The relay device includes a plurality of ports, a medium access control unit, and a relay processing unit. Each of the plurality of ports provides a physical layer. The medium access control unit is connected to the plurality of ports. The medium access control unit receives a communication frame from one port out of the plurality of ports. The medium access control unit transmits the communication frame to another port out of the plurality of ports. The relay processing unit transmits, in cooperation with the medium access control unit and through the medium access control unit, the communication frame received from the medium access control unit to another port that corresponds to destination information included in the communication frame.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
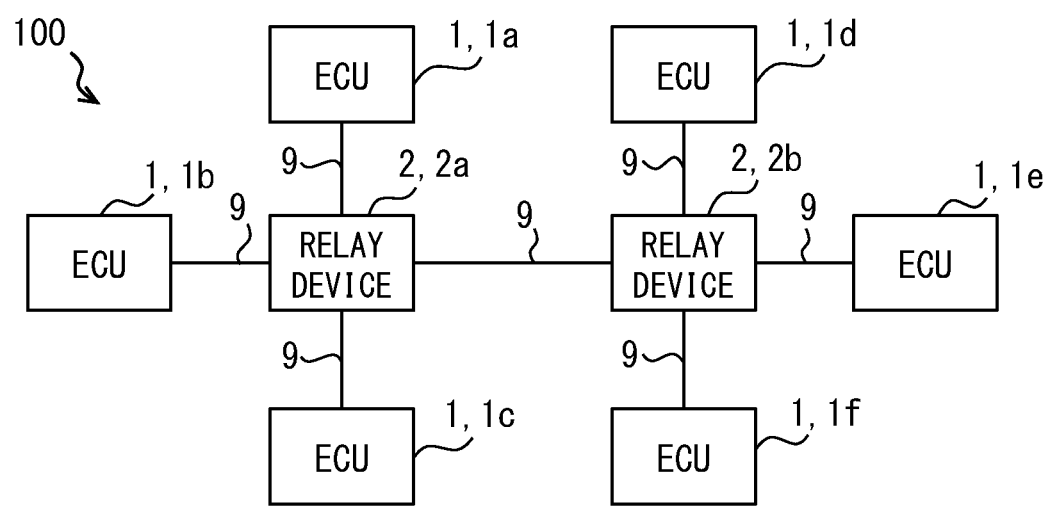
FIG. 1 is a diagram schematically showing a configuration of an in-vehicle communication system.

For example, a port of a relay device functions as a physical layer. The port also functions as a detector that detects whether communication with a node unit is possible. The port as a detector monitors communication availability of a communication line connecting the relay device with the node by periodically transmitting an electronic signal for communication check to the communication line. When an abnormality such as a disconnection occurs in the communication line and communication is impossible, the port as a detector detects the communication abnormality.

The configuration can detect the communication abnormality caused by the disconnection of the communication line or a poor connection between the communication line and the port. However, the configuration does not consider any abnormality inside the relay device. In other words, even when an abnormality related to the relay processing of the communication frame occurs inside the relay device (hereinafter, internal abnormality), the configuration cannot detect the occurrence of the internal abnormality. As a result, the state in which the relay device has an internal abnormality may continue. The internal abnormality related to the relay processing of the communication frame includes, for example, a state in which a part of the data is garbled into a bit value different from the original data (so-called garbled data, abnormal data) is transmitted to a destination, and a state in which the relay processing is stopped.

The present disclosure provides a relay device capable of detecting an occurrence of an internal abnormality.

An exemplary embodiment of the present disclosure provides a relay device. The relay device includes a plurality of ports, a medium access control unit, a relay processing unit, a check frame generation unit, and an abnormality detection unit. Each of the plurality of ports provides a physical layer. The medium access control unit is connected to the plurality of ports. The medium access control unit receives a communication frame from one port out of the plurality of ports. The medium access control unit transmits the communication frame to another port out of the plurality of ports. The relay processing unit transmits, in cooperation with the medium access control unit and through the medium access control unit, the communication frame received from the medium access control unit to another port that corresponds to destination information included in the communication frame as relay processing. The check frame generation unit generates a check frame that is a predetermined communication frame for checking operation of the relay processing unit. The abnormality detection unit determines whether the relay processing unit is operating normally based on the check frame. The relay processing includes a plurality of procedures. The relay processing unit performs a part or all of the plurality of procedures for the check frame. The abnormality detection unit determines that an abnormality has occurred in the relay processing unit when: (i) a pre-circulation frame that is a check frame before at least one procedure is performed mismatches with a post-circulation frame that is a check frame after the at least one procedure is performed; (ii) the post-circulation frame is not acquired after a predetermined time has elapsed since the pre-patrol frame is acquired; or (iii) time required from the acquisition of the pre-circulation frame to the acquisition of"

the post-circulation frame deviates from a predetermined expected value by equal to or more than a predetermined threshold value.

In the exemplary embodiment of the present disclosure, the relay device circulates the check frame to the relay processing device. The relay device detects the abnormality in the relay processing unit based on whether the check frame includes contents that is changed such as garbled bits, whether the post-circulation frame is acquired, or the time required for acquiring the post-circulation frame. Thus, the configuration can detect an internal abnormality of the relay processing unit.

Hereinafter, embodiments of the present disclosure will be described with reference to the drawings. FIG. 1 is a diagram showing an exemplary configuration of a communication system (hereinafter, in-vehicle communication system 100) constituted in a vehicle using a relay device 2 according to the present disclosure. The in-vehicle communication system 100 according to this embodiment is configured according to the in-vehicle Ethernet standard. Ethernet is a registered trademark. Hereinafter, data communication in accordance with the Ethernet communication protocol is referred to as Ethernet communication. Further, a communication frame refers to a communication frame in accordance with the Ethernet communication protocol (so-called Ethernet frame).

The in-vehicle communication system 100 includes a plurality of ECUs (Electronic Control Units) 1 as nodes and at least one relay device 2. The in-vehicle communication system 100 shown in FIG. 1 includes six ECUs 1 and two relay devices 2 as an example. When distinguishing between the two relay devices 2, the two relay devices 2 are described as relay devices 2a and 2b. Further, when distinguishing among each of the six ECUs 1, the six ECUs 1 are described as ECUs 1a to 1f. The ECUs 1a to 1c are connected to the relay device 2a via a communication cable 9 so as to be able to communicate with each other. The ECUs 1d to 1f are connected to the relay device 2b via a communication cable 9 so as to be able to communicate with each other. The relay device 2a and the relay device 2b are also connected to each other so as to be able to communicate with each other via the communication cable 9. The cable 9 may be a twisted pair cable.

The number of ECUs 1 and relay devices 2 constituting the in-vehicle communication system 100 is an example, and can be changed as appropriate. Further, the network topology of the in-vehicle communication system 100 shown in FIG. 1 is an example and is not limited thereto. The network topology of the in-vehicle communication system 100 may be a mesh type, a star type, a bus type, a ring type, or the like. The network shape can also be changed as appropriate.

As described above, the ECU 1 is connected to the relay device 2 via the communication cable 9. The ECU 1 performs transmission and reception of data with another ECU 1 via the relay device 2 according to the Ethernet communication protocol. Each ECU 1 directly communicates with the relay device 2. The communication device (in other words, the node) included in the in-vehicle communication system 100 may be a sensor or the like other than the ECU 1. The node may be an external tool capable of dynamically changing the connection state to the in-vehicle communication system 100 by a user or an inspector. The relay device 2 can also correspond to a node from another point of view. For example, for the relay device 2a, the relay device 2b corresponds to one of the nodes connected to the relay device 2a. Unique identification information (MAC address) is assigned to each of the ECU 1 and the relay device 2.

Figure 2:
FIG. 2 is a diagram schematically showing a configuration of an Ethernet frame.

As shown in FIG. 2, the communication frame transmitted by each ECU 1 includes a preamble part, a header part, a data part, and an FCS (Frame Check Sequence) part. The header part includes a destination MAC address, a source MAC address, a length, a type, and the like. The destination MAC address is a MAC address of the ECU 1 to be communicated, and the source MAC address is a MAC address of the ECU 1 that is a source of the communication frame. The destination MAC address corresponds to destination information. An area where the bit string as the destination MAC address is arranged corresponds to a destination address area. The data part is an area in which the data is stored. The FSC part is an area in which a CRC (Cyclic Redundancy Check) value for detecting data corruption or error is stored.

Figure 3:
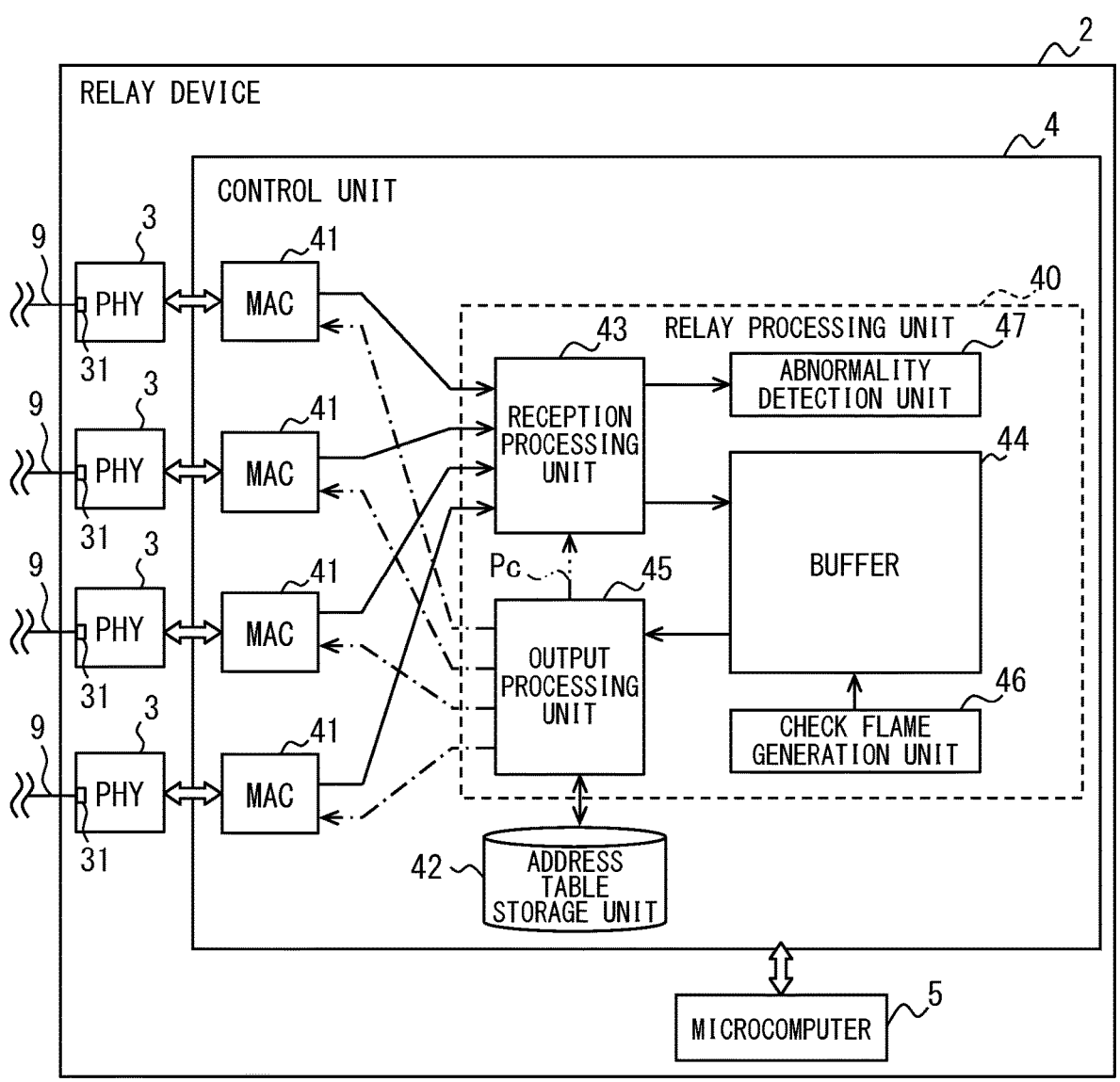
FIG. 3 is a block diagram showing a configuration of a relay device.

The relay device 2 is a device that transmits a communication frame received from a certain communication cable 9 to a communication cable 9 according to the destination of the communication frame. As shown in FIG. 3, the relay device 2 includes a plurality of PHYs 3, a control unit 4, and a microcomputer 5.

The PHY 3 is connected to the communication cable 9 and functions as the physical layer in the OSI reference model. The PHY 3 includes a port 31 that is electrically connected to the communication cable 9. In the present embodiment, as an example, one communication cable 9 is connected to one PHY 3. That is, each PHY 3 includes one port 31 for connecting to the communication cable 9.

For example, one PHY 3 included in the relay device 2a is connected to the ECU 1a via a communication cable 9, and another PHY 3 is connected to the ECU 1b via a communication cable 9. In addition, the relay device 2a includes a PHY 3 connected to the ECU 1c via a communication cable 9, a PHY 3 connected to the relay device 2b, and the like. The number of PHYs 3 included in the relay device 2 corresponds to the number of nodes to which the relay device 2 can be connected. As an example, the relay device 2 of the present embodiment includes six PHYs 3 so as to enable Ethernet communication with a maximum of six nodes. As another configuration, the number of PHYs 3 included in the relay device 2 may be four or eight. The number of PHYs 3 may be as many as the number of communication cables 9 (and thus nodes) to which the relay device 2 can be connected. As another configuration, the PHY 3 may include a plurality of ports 31. For example, PHY 3 may have two ports 31.

A unique port number is set for each of the plurality of ports 31 included in the relay device 2. For convenience, when a plurality of ports 31 included in the relay device 2 are distinguished, the port number K set in the port 31 is used for being described as the Kth port. For example, the first port refers to the port 31 whose port number is set to 1, and the second port refers to the port 31 whose port number is set to 2. The relay device 2 of the present embodiment includes first to sixth ports.

Generally, the PHY 3 converts the signal input from the connected communication cable 9 (hereinafter, the connection cable) into a digital signal that can be processed by the control unit 4, and outputs the digital signal to the control unit 4 (specifically, the MAC 41). Further, the PHY 3 converts the digital signal input from the control unit 4 into an analog signal, which is an electric signal and can be transmitted to the communication cable 9, and outputs the converted signal to a predetermined communication cable 9.

In addition to the above-described signal conversion, the PHY 3 also performs frame coding, serial/parallel conversion, signal waveform conversion, and the like. The PHY 3 is provided by an IC including an analog circuit. That is, the PHY 3 is a hardware circuit.

The control unit 4 is connected to each of the plurality of PHYs 3 and is also connected to the microcomputer 5 so as to be able to communicate with each other. The control unit 4 is programmed to function as a second layer (data link layer) of the OSI reference model. That is, the control unit 4 identifies a second PHY 3 (strictly speaking, the port 31) to which the communication frame is to be transmitted based on the destination MAC address included in the communication frame input from a first PHY 3, and outputs the communication frame to the identified second PHY 3. Further, when the control unit 4 detects an internal abnormality, the control unit 4 notifies the microcomputer 5 of the information.

The control unit 4 is also programmed to function as a third layer (network layer) of the OSI reference model. That is, the control unit 4 relays the communication frames between different networks. The control unit 4 as the third layer performs relay processing using an IP (Internet Protocol) address. The function of the third layer may be provided in the microcomputer 5. The functional arrangement in the relay device 2 can be changed as appropriate.

The control unit 4 is realized by using, for example, an FPGA (field-programmable gate array). The control unit 4 may be realized by using an ASIC (application specific integrated circuit). Further, the control unit 4 may be realized by using an MPU, a CPU, or a GPU. Details of the function and configuration of the control unit 4 will be described later.

The microcomputer 5 is a computer including a CPU, a ROM, a RAM, an I/O, and a bus line for connecting these components. The ROM stores a program for causing a general-purpose computer to function as the microcomputer 5. The microcomputer 5 provides the functions from the fourth layer to the seventh layer of the OSI reference model by the CPU executing the program stored in the ROM while using the temporary storage function of the RAM. That is, the fourth layer to seventh layer are realized by software processing. It should be noted that a storage medium for storing the program executed by the CPU is not limited to the ROM. The program may be stored in a non-transitory tangible storage medium.

The fourth layer is a transport layer and executes inter-program communication, data transfer guarantee, and the like. The fifth layer is a session layer, the sixth layer is a presentation layer, and the seventh layer is an application layer. The fifth layer, the sixth layer, and the seventh layer execute user authentication, data encoding and decoding, a user interface function, and the like. The relay device 2 having these functions can also be referred to as a switching hub ECU.

(Configuration and Function of Control Unit 4)

The control unit 4 includes a plurality of MACs 41, an address table storage unit 42, a reception processing unit 43, a buffer 44, an output processing unit 45, a check frame generation unit 46, and an abnormality detection unit 47. The configuration including the reception processing unit 43, the buffer 44, and the output processing unit 45 corresponds to a relay processing unit 40. The relay processing unit 40 is also referred to as a relay processor. The address table storage unit 42 is also referred to as an address table storage. The check frame generation unit 46 is also referred to as a check frame generation processor. The abnormality detection unit 47 is also referred to as an abnormality detection processor.

The MAC 41 performs medium access control in the Ethernet communication protocol. Each of the plurality of MACs 41 is connected to one PHY 3. The MAC 41 may be connected to the plurality of PHYs 3. The MAC 41 corresponds to a medium access control unit.

Each MAC 41 provides the functions defined by IEEE 802.3. For example, the MAC 41 refers to the FCS of the communication frame (hereinafter, also referred to as a reception frame) input from PHY 3, and determines whether an abnormality such as corruption has occurred in the data. Further, the MAC 41 observes the length of the reception frame and determines whether it is too long or too short. The MAC 41 stores the number of communication frames received in the last fixed time, the number of communication frames in which an abnormality has been detected (hereinafter referred to as an abnormal frame), and the like. The number of received frames and the number of abnormal frames are referred to by the microcomputer 5. The MAC 41 may take measures such as requesting retransmission when an abnormality in a communication frame is detected based on FCS.

The MAC 41 provides the reception processing unit 43 with a reception frame in which no abnormality is found. In addition, the MAC 41 outputs the communication frame input from the output processing unit 45 to the PHY 3 corresponding to the MAC 41, and transmits the communication frame to the communication cable 9. The MAC 41 performs CSMA/CD (Carrier Sense Multiple Access/Collision Detection) in cooperation with the PHY 3. The MAC 41 transmits the communication frame input from the output processing unit 45 to the communication cable 9 in cooperation with the PHY 3 at a time point determined according to the result of the carrier sense. When a communication frame collision occurs, the communication frame is retransmitted.

The address table storage unit 42 is a storage medium that stores data (hereinafter, address table) indicating the MAC address of the node connected to each PHY 3 (specifically, each port 31). The address table indicates the correspondence between the number for each port 31 (so-called port number) and the MAC address of the node connected to the port 31. The MAC address for each PHY 3 is learned by various methods such as learning bridge and ARP (Address Resolution Protocol). A detailed description of the method of generating the address table will be omitted. The control unit 4 may be provided with the function of learning the MAC address of the connection destination for each PHY 3 (hereinafter, the address table update function), or the microcomputer 5 may be provided with the function.

The reception processing unit 43 stores the reception frame input from the MAC 41 in the buffer 44. The buffer 44 is a memory that stores a reception frame until the transmission of the communication frame is completed. The size of the buffer 44 is, for example, 128 K Byte. The buffer 44 is operated by being divided into a plurality of blocks. As an example, the buffer 44 of the present embodiment includes 1024 blocks of 128 bytes per block.

Further, the buffer 44 includes a queue corresponding to each port 31. As an example, the buffer 44 of the present embodiment includes two queues for one port 31 which is an output destination of a communication frame. Each queue is achieved using at least one block. The number of blocks allocated to each queue is variable. For convenience, the two queues for one destination port are referred to as a first queue and a second queue. Different priorities can be set for the first queue and the second queue. Here, as an example, the first queue has a higher priority than the second queue. The priority here is for the output processing unit 45 extracting a communication frame from the buffer 44 (strictly speaking, a queue). The priority for each queue functions as a weight for guaranteeing the minimum bandwidth in the output processing of the communication frame by the output processing unit 45. In addition, as another embodiment, the priority of the first queue and the second queue may be the same.

The reception processing unit 43 stores the reception frame input from the MAC 41 in a queue corresponding to the port 31 as the output destination. The port number to be the output destination of the reception frame is identified using the destination MAC address described in the header part of the communication frame and the address table. The reception processing unit 43 refers to the address table, and identifies the port number associated with the destination MAC address of the reception frame. Then, the reception frame is stored in the queue corresponding to the identified port number. For example, when the reception processing unit 43 receives a communication frame to be output to the first port, the reception processing unit 43 stores the reception frame in the queue for the first port. Whether to input to the first queue or the second queue is determined according to the contents of the received frame. For convenience, the processing for identifying the output destination of the communication frame is also referred to as an output destination identification processing.

In the present embodiment, the reception processing unit 43 identifies the output port of the reception frame, but the present disclosure is not limited thereto. The processing for identifying the output port of the reception frame based on the address table (that is, the output destination identification processing) may be executed by the output processing unit 45. Further, the output destination identification processing may be performed by a configuration independent of the reception processing unit 43 and the output processing unit 45. The arrangement of the functions provided in the relay processing unit 40 can be appropriately changed.

Further, the reception processing unit 43 is connected to the output processing unit 45 by a check frame dedicated path Pc that is a dedicated path for the check frame. When the check frame is input from the output processing unit 45, the reception processing unit 43 outputs the check frame to the abnormality detection unit 47. The check frame dedicated path Pc may be a virtual path or may have an actual configuration. The path indicated by the alternate long and short dash line in FIG. 3 indicates the check frame dedicated path Pc. The check frame output from the reception processing unit 43 to the abnormality detection unit 47 corresponds to the post-circulation frame.

The output processing unit 45 mainly outputs the communication frame stored in the buffer 44 to the MAC 41 (and thus the PHY 3) according to the destination of the communication frame. For example, the output processing unit 45 outputs the communication frame to be output to the first port to the MAC 41 corresponding to PHY 3 having the first port. The output processing unit 45 is connected to each of the plurality of MACs 41 by a relay frame path. The relay frame path is a path for the communication frame from the output processing unit 45 to each MAC 41. The relay frame path may be a virtual path or may have an actual configuration. The path indicated by the dash-dot line in FIG. 3 indicates the relay frame path.

When the check frame is stored in the buffer 44, the output processing unit 45 outputs the check frame to the reception processing unit 43 using the check frame dedicated path Pc. The output processing unit 45 of the present embodiment outputs the communication frame stored in the buffer 44 according to the priority set in advance according to the type of the communication frame. The priority of the check frame is lower than that of the reception frame, which is the communication frame input from the MAC 41 (and thus the port 31). Thus, since the output of the reception frame is prioritized over the output of the check frame, the configuration can suppress the communication delay due to the relay processing in the second layer.

The output processing unit 45 extracts the check frame from the buffer 44 within a predetermined output standby time after the check frame is stored in the buffer 44, and outputs the check frame to the reception processing unit 43. When, as a result of output control according to the priority, the time that the check frame stays in the buffer 44 becomes the output standby time, the output processing of the check frame is interrupted by the output processing of the reception frame.

Figure 4:
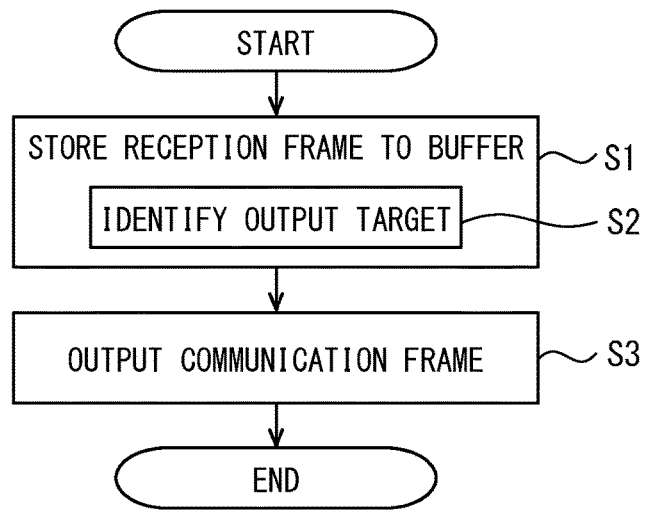
FIG. 4 is a flowchart showing a procedure included in the relay processing.

As shown in FIG. 4, the relay processing here includes a reception procedure S1, an output destination identification procedure S2, and an output procedure S3. The reception procedure S1 stores the reception frame in the buffer 44, and the output destination identification procedure S2 identifies the port to be the output destination of the reception frame. The output destination identification procedure S2 corresponds to a procedure for executing the output destination identification processing. The output procedure S3 outputs the communication frame stored in the buffer 44 to a path according to the destination. As described above, in the present embodiment, the output destination identification procedure S2 is included in the reception procedure S1, but is not limited thereto. The execution order of the procedures and which procedures are included as one procedure can be changed as appropriate.

The check frame generation unit 46 generates a predetermined check frame for checking the operation of the relay processing unit 40 and stores (in other words, inputs) the check frame in the buffer 44. The queue in which the check frame is input in the buffer 44 is sequentially changed so that the check frame passes through the entire area of the buffer 44. Specifically, each time the check frame generation unit 46 generates a check frame, the queue as the storage destination of the check frame is changed in the order of the first queue for the first port, the second queue for the first port, the first queue for the second port, the second queue for the second port, the first queue for the third port, . . . , the second queue for the six port. In other words, the check frame corresponding to each of the plurality of queues is sequentially generated and input to each queue. The configuration can check all queues included in the buffer 44. Thus, when any of the plurality of queues has an abnormality, the configuration can detect the abnormality.

Figure 5:
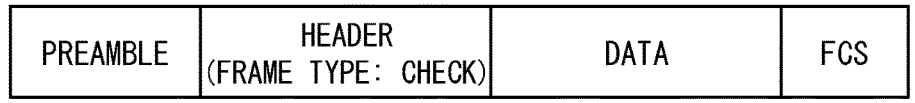
FIG. 5 is a diagram showing a configuration of a check frame.

As shown in FIG. 5, the header of the check frame includes frame type information indicating that the communication frame is a check frame. Further, the header of the check frame includes a port number and a queue as information indicating an input destination in the buffer 44 (hereinafter, pseudo destination information). The output processing unit 45 and the reception processing unit 43 identify that the communication frame is a check frame by referring to the frame type information in the header. As a result, the check frame circulates inside the relay device 2 and is not output to the outside. As a result, the configuration can further reduce the risk of affecting other communication devices when the self-diagnosis function using the check frame is added to the relay device 2. Information for identifying whether the communication frame is a check frame may be described in an area other than the header. For example, information for identifying whether the communication frame is a check frame may be included in the data part.

In addition, the destination MAC address of the check frame is set to a predetermined address value that is not received by any communication device. As a result, even when the check frame leaks to the outside of the port 31, the check frame will not be received by any communication device. As a result, the configuration can further reduce the risk of affecting other communication devices when the self-diagnosis function using the check frame is added to the relay device 2. The destination MAC address (6 Byte) that is not received by any communication device is, for example, an address in which all bits are set to 0 (that is, 00:00:00:00:00:00).

In addition, the source MAC address of the check frame is set to an address in which all bits are set to 0. According to such a setting, the check frame is processed as an error frame in the communication device. In addition, the check frame generation unit 46 may set a value not specified by IEEE802.3 in the Ether Type (2 Byte) area of the check frame. With such a setting, even when the check frame leaks to the outside and is received by another device, the check frame is discarded. The value of Ether Type not identified by IEEE802.3 is, for example, 0xFFFF. A communication frame in which Ether Type is set to 0xFFFF indicates that it is a check frame.

For example, the check frame generation unit 46 periodically generates a check frame at a predetermined internal check cycle and inputs the check frame into a predetermined area of the buffer 44 (for example, a queue to be checked). When the check frame generation unit 46 generates the check frame, the check frame generation unit 46 also provides the check frame to the abnormality detection unit 47. As a result, the abnormality detection unit 47 acquires the check frame that has been just generated by the check frame generation unit 46 (in other words, the check frame that has not been processed). The abnormality detection unit 47 may acquire the check frame generated by the check frame generation unit 46 by referring to the check frame input to the predetermined area of the buffer 44. The check frame just stored in the buffer 44, in other words, the check frame immediately after generated by the check frame generation unit 46 corresponds to the pre-circulation frame.

The check frame input (in other words, stored) to the buffer 44 by the check frame generation unit 46 is extracted by the output processing unit 45, and input to the reception processing unit 43 via the check frame dedicated path Pc. It is assumed that the output processing unit 45 does not perform the output processing for the check frame for a predetermined prohibition time since the output processing unit 45 performs the output processing for the check frame. The prohibition time may be set to the same value as the internal check cycle. As described above, when the reception processing unit 43 receives the check frame, the reception processing unit 43 provides the check frame to the abnormality detection unit 47.

When the check frame is input from the reception processing unit 43, the abnormality detection unit 47 compares the pre-circulation frame provided by the check frame generation unit 46 with the post-circulation frame input from the reception processing unit 43. That is, the abnormality detection unit 47 performs a process of comparing the contents of the pre-circulation frame with the contents of the post-circulation frame (hereinafter, comparison processing). Then, when the pre-circulation frame and the post-circulation frame do not match, the abnormality detection unit 47 determines that an abnormality has occurred in the relay processing unit 40. Determining that an abnormality has occurred in the relay processing unit 40 corresponds to detecting an internal abnormality in the relay processing unit 40.

In addition, when the check frame generation unit 46 inputs the check frame to the buffer 44, and the output processing unit 45 does not extract the check frame even after a predetermined output standby time has elapsed, the abnormality detection unit 47 determines that an abnormality has occurred in the processing unit 40. Further, when the check frame is not input from the reception processing unit 43 even after a predetermined cycle upper limit circulation time has elapsed from the time when the output processing unit 45 extracts the check frame from the buffer 44, the abnormality detection unit 47 determines that an abnormality has occurred in the relay processing unit 40.

The specific values of the output standby time and the upper limit circulation time may be appropriately determined. The time when the check frame is extracted from the buffer 44 corresponds to the time when the check frame is considered to start the circulation (hereinafter, the circulation start time). The case where the check frame is not input from the reception processing unit 43 even after the predetermined circulation upper limit time has elapsed from the start of the circulation corresponds a case where the post-circulation frame cannot be obtained even after the predetermined time has passed since the pre-circulation frame was generated. As another embodiment, the circulation start time may be the time when the check frame generation unit 46 generates the check frame, in other words, the time when the check frame is stored in the buffer 44.

In addition, the abnormality detection unit 47 measures the time required from the extraction of the check frame from the buffer 44 by the output processing unit 45 to the input of the check frame from the reception processing unit 43 (hereinafter, circulation required time). Then, when the circulation required time deviates from a predetermined expected value by equal to or more than a predetermined threshold value, the abnormality detection unit 47, for example, determines that an abnormality has occurred in the relay processing unit 40. The expected value for the circulation required time is, for example, an average value of the circulation required time observed when the relay processing unit 40 is operating normally, and the specific value may be appropriately determined. The case where the circulation required time exceeds the expected value corresponds to the case where a processing delay occurs. The case where the circulation required time deviates from the expected value by equal to or more than a predetermined threshold value corresponds to the case where the delay time is equal to or more than a predetermined threshold value.

Figure 6:
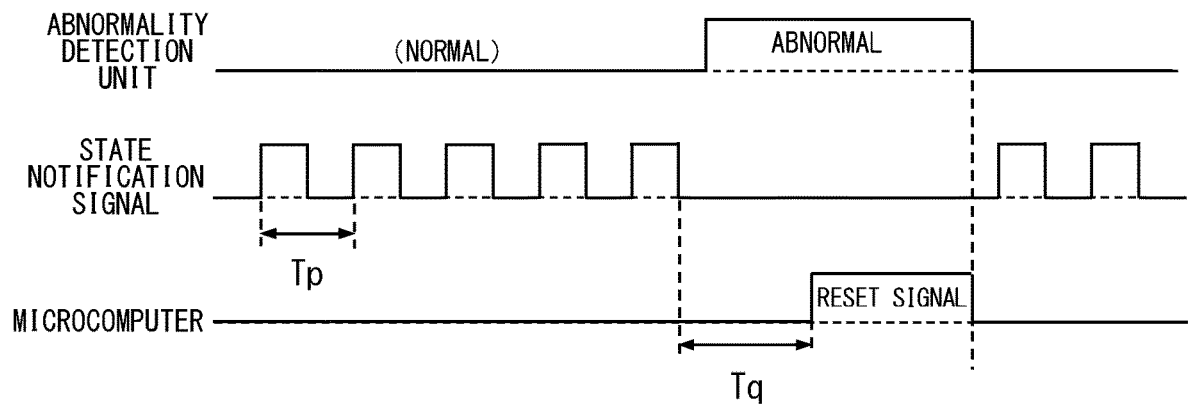
FIG. 6 is a diagram showing an operation of an abnormality detection unit and a microcomputer.

When the abnormality detection unit 47 determines that an abnormality has occurred in the relay processing unit 40, the abnormality detection unit 47 notifies the microcomputer 5 of the occurrence of the internal abnormality. For example, when the abnormality detection unit 47 does not determine that an abnormality has occurred, the abnormality detection unit 47 periodically transmits a pulse signal as a state notification signal to the microcomputer 5 at a predetermined transmission interval Tp. On the other hand, when the abnormality detection unit 47 determines that an abnormality has occurred, the abnormality detection unit 47 outputs a signal fixed to a high level or a low level as the state notification signal. FIG. 6 shows a configuration in which a low level signal is continuously output as a state notification signal indicating that an abnormality has been detected.

The microcomputer 5 determines that the relay processing unit 40 is operating normally based on the periodic input of the pulse signal from the control unit 4. When the edge of the state notification signal is not observed for equal to or more than the predetermined standby time Tq, the microcomputer 5 determines that an abnormality has occurred in the relay processing unit 40 and outputs a reset signal. The standby time Tq may be a value longer than the transmission interval Tp, such as a value obtained by doubling the transmission interval Tp of the pulse signal. The case where the edge of the state notification signal is not observed for equal to or more than the predetermined standby time Tq corresponds to the case where the state notification signal remains at the high level or the low level for equal to or more than the predetermined standby time Tq.

As described above, when the microcomputer 5 detects that the relay processing unit 40 is not operating normally, the microcomputer 5 restarts, for example, the control unit 4 as a normalization processing. As a result, the normal state is restored. The normalization processing restores the operation of the relay processing unit 40 to the normal state. The normal state of the relay processing unit 40 refers to a state in which the output delay, loss, or data garbled of the communication frame has not occurred. The restart of the control unit 4 may be realized by inputting a reset signal, or may be performed by temporarily cutting off the power supply to the control unit 4. The restart of the control unit 4 by temporarily cutting off the power supply to the control unit 4 is also referred to as a hard reboot.

According to the configuration in which the pulse signal is periodically transmitted as the state notification signal when the relay processing unit 40 is operating normally as in the present embodiment, it can be detected that the edge input interval is not only longer but also shorter than the specified period. The case where the edge input interval is too short is a case where some trouble has occurred in the circuit that generates the status notification signal. According to the above configuration, even when the edge input interval is shorter than the specified period, an abnormality can be detected. Thus, the reliability of the relay device 2 can be further improved.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency. Note that members having the same functions as those described in the above embodiment are denoted by the same reference numerals, and a description of the same members will be omitted. When only a part of the configuration is referred to, the configuration of the embodiment described above can be applied to other parts.

(First Modification)

Figure 7:
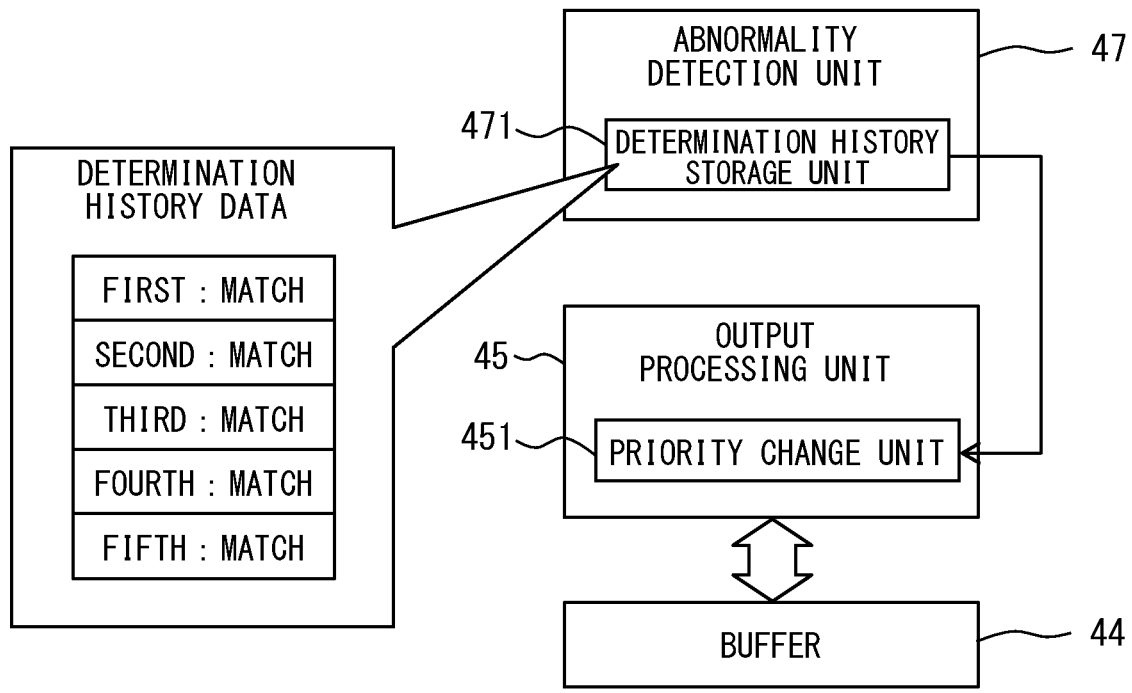
FIG. 7 is a block diagram showing a configuration of a relay device of first and second modifications.

The abnormality detection unit 47 may be determine whether an abnormality has occurred in the relay processing unit 40 based on the result of the comparison processing for the latest N times (that is, the latest fixed number of times). In this case, as shown in FIG. 7, the abnormality detection unit 47 includes a determination history storage unit 471 that stores the results of the latest N times of the comparison processing. N may be set to a natural number of 3 or more, for example, N=5. It is needless to say that N may be 3, 8, 10, or the like.

As a result of the collection processing for the last 5 times, the abnormality detection unit 47 may detect mismatches between the frame contents at the start of the circulation and the end of the circulation for 3 times or more (in other words, the majority). In this case, the abnormality detection unit 47 determines that an abnormality has occurred in the relay processing unit 40. The abnormality detection unit 47 determines that an abnormality has occurred in the relay processing unit 40 when the ratio of the number of times when the mismatch of the frame contents at the start and the end of the circulation is detected is equal to or more than a predetermined threshold value. FIG. 7 shows a case where the frame contents at the start of the circulation and the end of the circulation match in each of the past five comparison processing.

(Second Modification)

As an application of the first modification, the output processing unit 45 includes a priority change unit 451 that changes the priority of processing the check frame stored in the buffer 44 based on the result of the latest N times of comparison processing. For example, when the number of the detections of the mismatches in the frame contents is less than M times as a result of the comparison processing for the last N times, the priority change unit 451 sets the priority of the check frame lower than that of the reception frame. As a result, the output processing unit 45 prioritizes the output processing of the reception frame over the output processing of the check frame. On the other hand, when the number of the detections of the mismatches in the frame contents is equal to or more than M times, the priority change unit 451 sets the priority of the check frame higher than that of the reception frame.

The configuration can prioritize the comparison processing over the relay of the reception frame (in other words, transfer) when there is a suspicion that an abnormality has occurred in the relay processing unit 40. As a result, the abnormality of the relay processing unit 40 can be detected more quickly. Further, the configuration can accelerate the detection of the abnormality of the relay processing unit 40, and reduce the influence of the abnormality of the relay processing unit 40 on the in-vehicle communication system 100.

The parameter M (hereinafter, mode change threshold value) M that functions as a threshold value for changing the priority of the check frame may be appropriately designed within a range of equal to or less than N. For example, the mode change threshold value M may be 1, 3, or the like. The change of the priority of the check frame corresponds to the change of the operation of the output processing unit 45.

(Third Modification)

Figure 8:
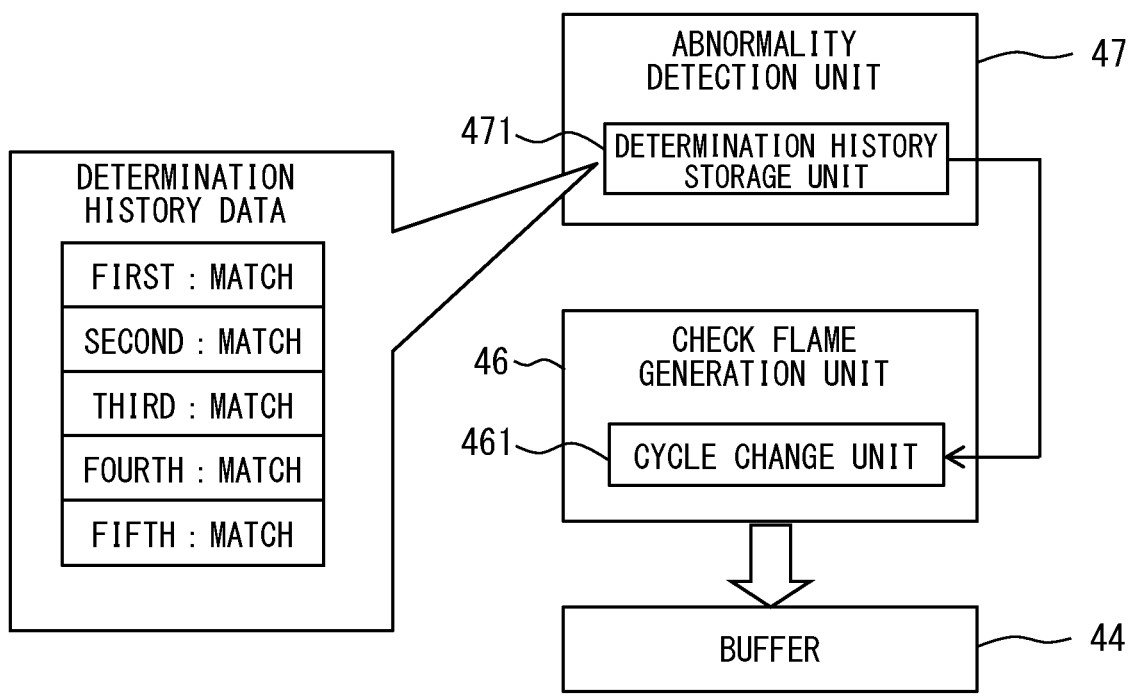
FIG. 8 is a block diagram showing a configuration of a relay device of first and third modifications.

As an application of the first and second modifications, as shown in FIG. 8, the check frame generation unit 46 may include a cycle change unit 461 that changes the generation cycle for the check frame (that is, internal check cycle) based on the result of the comparison processing for the latest N times. For example, when the number of the detections of the mismatches in the frame contents is equal to or than M times as a result of the comparison processing for the last N times, the cycle change unit 461 causes the generation cycle for the check frame to be shorter than the generation cycle when the number of the detections of the mismatches in the frame contents is less than M times. More specifically, when the number of the detections of the mismatches in the frame contents is equal to or than M times, the cycle change unit 461 causes the generation cycle for the check frame to be half of the generation cycle when the number of the detections of the mismatches in the frame contents is less than M times.

The configuration shortens the cycle of the execution of the comparison processing when there is a suspicion that an abnormality has occurred in the relay processing unit 40. As a result, the abnormality of the relay processing unit 40 can be detected more quickly. It is preferable that the third modification is performed in combination with the second modification.

(Fourth Modification)

In the above-described embodiment, the check frame is circulated in the order of the buffer 44, the output processing unit 45, and the reception processing unit 43, however the present disclosure is not limited thereto. The circulation route of the check frame can be changed as appropriate. For example, the check frame may perform the plurality of procedures related to the relay processing in the order of the output processing unit 45, the reception processing unit 43, and the buffer 44. In this case, the check frame generation unit 46 may provide the generated check frame to the output processing unit 45 without going through the buffer 44 (that is, directly). When the check frame is input from the output processing unit 45, the reception processing unit 43 inputs the check frame to the queue shown in the pseudo destination information among the plurality of queues included in the buffer 44. Such a configuration also achieves the same effects as those of the embodiment described above.

Figure 9:
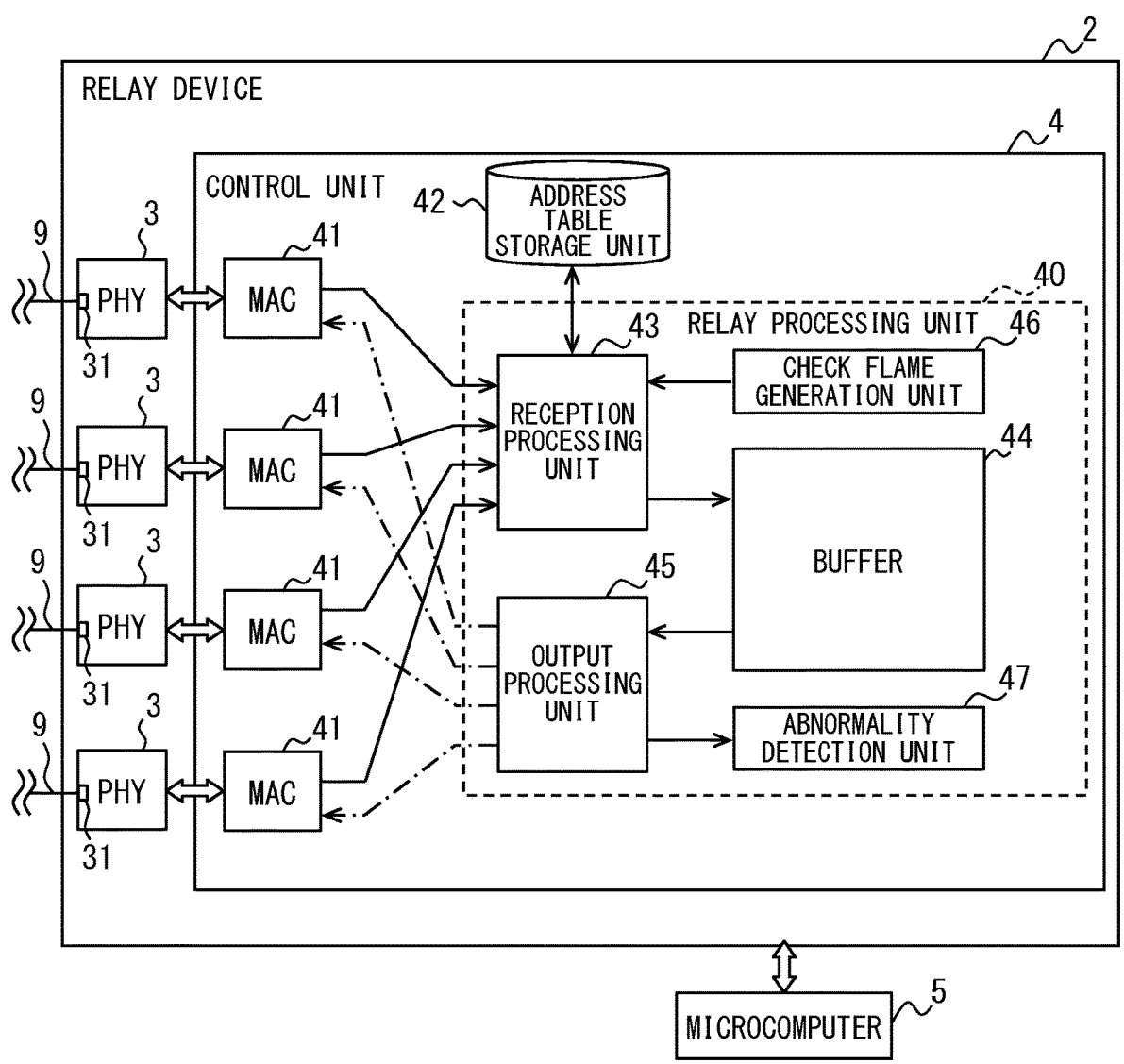
FIG. 9 is a block diagram showing a modified example of a configuration of a relay device.
Figure 10:
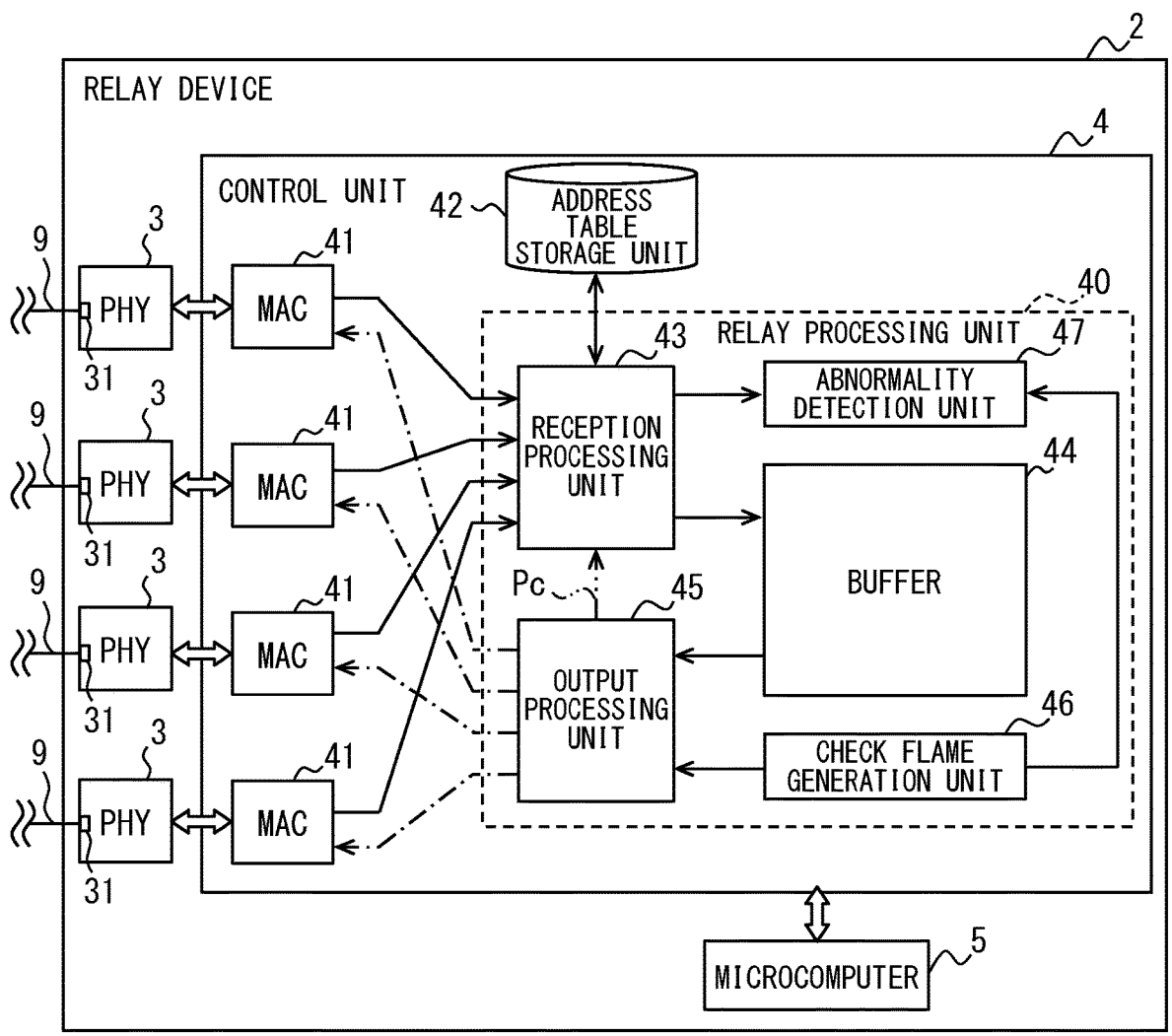
FIG. 10 is a block diagram showing a modified example of a configuration of a relay device.

As another embodiment, the check frame circulates in the order of the check frame generation unit 46, the reception processing unit 43, the buffer 44, and the output processing unit 45 so as to perform the plurality of procedures. In this case, as shown in FIG. 9, the check frame generation unit 46 inputs the generated check frame to the reception processing unit 43, and the output processing unit 45 outputs the check frame stored in the buffer 44 to the abnormality detection unit 47. Further, as shown in FIG. 10, the check frame generated by the check frame generation unit 46 may be provided to the output processing unit 45 and the abnormality detection unit 47 without going through the buffer 44. In addition, the reception processing unit 43 may directly provide the check frame input from the output processing unit 45 to the abnormality detection unit 47. The reception processing unit 43 may provide the check frame input from the output processing unit 45 to the abnormality detection unit 47 via the buffer 44.

In addition, the check frame may circulates in the order of the reception processing unit 43, the buffer 44, and the output processing unit 45, starting from each MAC 41. The configuration may be realized by each MAC 41 including the check frame generation unit 46. Further, the above configuration may be realized by the check frame generation unit 46 inputting the check frame to each MAC 41.

In addition, the check frame may not pass through the buffer 44. For example, the check frame generated by the check frame generation unit 46 may be input to the abnormality detection unit 47 through the output processing unit 45 and the reception processing unit 43. The configuration can determine whether the reception processing unit 43 and the output processing unit 45 are functioning normally.

(Fifth Modification)

When the abnormality detection unit 47 identifies the queue in which the abnormality has occurred, the microcomputer 5, as the normalization processing, can avoid using the queue in which the check frame is stopped. Of the plurality of queues included in the buffer 44, which queue the check frame has stopped can be identified by the abnormality detection unit 47 by generating a check frame for each queue. Further, in the above-described embodiment, the microcomputer 5 restarts the control unit 4 as the normalization processing, however the present disclosure is not limited thereto. The microcomputer 5 may clear a specific buffer, or refresh a part of the route. Further, the relay device 2 may restart itself.

Means and/or functions provided by the relay device 2 may be provided by software recorded in a substantive memory device and a computer that can execute the software, software only, hardware only, or some combination of them. Some or all of the functions of the relay device 2 may be realized as hardware. A configuration in which a certain function is realized as hardware includes a configuration in which the function is realized by use of one or more ICs or the like. For example, when a part of the functions or all of the functions of the vehicle relay device 2 is provided by an electronic circuit being hardware, it may be possible to provide it by a digital circuit including multiple logic circuits or analog circuits.

What is claimed is:

1. A relay device comprising:
a plurality of ports each provides a physical layer;
a Medium Access Controller (MAC) connected to the plurality of ports and configured to receive a communication frame from one port out of the plurality of ports and transmit the communication frame to another port out of the plurality of ports;
a relay processing unit that includes at least one processor configured to transmit, in cooperation with the MAC and through the MAC, the communication frame received from the MAC to another port that corresponds to destination information included in the communication frame as relay processing;
a check frame generation unit configured to generate a check frame that is a predetermined communication frame for checking operation of the relay processing unit;
an abnormality detection unit configured to determine whether the relay processing unit is operating normally based on the check frame; and
a buffer configured to store the communication frame;
wherein:
the relay processing includes a plurality of procedures,
the relay processing unit performs a part or all of the plurality of procedures for the check frame,
the abnormality detection unit determines that an abnormality has occurred in the relay processing unit when:
(i) a pre-circulation frame that is a check frame before at least one procedure is performed mismatches with a post-circulation frame that is a check frame after the at least one procedure is performed;
(ii) the post-circulation frame is not acquired after a predetermined time has elapsed since the pre-circulation frame is acquired; or
(iii) time required from the acquisition of the pre-circulation frame to the acquisition of the post-circulation frame deviates from a predetermined expected value by equal to or more than a predetermined threshold value,
the at least one processor of the relay processing unit is further configured to:

transmit, as a reception procedure, a reception frame that is the communication frame received from the MAC to the buffer, and transmit, as an output procedure, the communication frame stored in the buffer to a configuration according to a destination of the communication frame, and transmit the reception frame to the MAC according to the destination of the reception frame, and to not transmit the check frame to the MAC.

2. The relay device according to claim 1, wherein:

the check frame generation unit provides the check frame to the at least one processor of the relay output processing unit, the at least one processor of the relay processing unit is further configured to store the check frame in the buffer, and the abnormality detection unit (i) acquires, as the pre-circulation frame, the check frame generated by the check frame generation unit, (ii) acquires, as the post-circulation frame, the check frame stored in the buffer, and (iii) compares the pre-circulation frame with the post-circulation frame.

3. The relay device according to claim 1, wherein:

the check frame generation unit stores the check frame in the buffer, the at least one processor of the relay processing unit is further configured to receive the check frame from the buffer and provide the check frame to the abnormality detection unit, and the abnormality detection unit (i) acquires, as the pre-circulation frame, the check frame generated by the check frame generation unit, (ii) acquires, as the post-circulation frame, the check frame provided by the at least one processor of the relay processing unit, and (iii) compares the pre-circulation frame with the post-circulation frame.

4. The relay device according to claim 3, wherein:

the check frame generation unit periodically stores the check frame in the buffer at a predetermined check cycle, and the abnormality detection unit (i) determines, as a comparison processing, whether the pre-circulation frame matches with the post-circulation frame, and (ii) determines whether the abnormality has occurred in the relay processing unit based on results of the comparison processing for a latest fixed number of times.

5. The relay device according to claim 4, wherein when a number of times or a ratio of the number of times for mismatching the pre-circulation frame with the post-circulation frame is equal to or more than a predetermined threshold value within the latest fixed number of times, the check frame generation unit causes the check cycle to be shorter compared to a case where the pre-circulation frame is matched with the post-circulation frame.

6. The relay device according to claim 4, wherein the at least one processor of the relay processing unit is further configured to transmit the communication frame stored in the buffer according to a priority set for a type of the communication frame, and (ii) cause the priority for the check frame to be extracted from the buffer to be higher compared to a case where the pre-circulation frame is matched with the post-circulation frame when a number of times or a ratio of the number of times for mismatching the pre-circulation frame with the post-circulation frame is equal to or more than a predetermined threshold value within the latest fixed number of times.

7. The relay device according to claim 1, wherein:

the check frame generation unit provides the check frame to the at least one processor of the relay processing unit, the at least one processor of the relay processing unit is further configured to provide the check frame to the abnormality detection unit, and the abnormality detection unit (i) acquires, as the pre-circulation frame, the check frame generated by the check frame generation unit, (ii) acquires, as the post-circulation frame, the check frame provided from the at least one processor of the relay processing unit, and (iii) compares the pre-circulation frame with the post-circulation frame.

8. The relay device according to claim 1, wherein:

the check frame has a header including information of a type of the communication frame, and the relay processing unit identifies whether the communication frame stored in the buffer is the check frame by referring to the header.

9. The relay device according to claim 1, wherein the check frame generation unit sets a predetermined address value that is not received by any communication device in a destination address area of the check frame.

10. The relay device according to claim 1, wherein the relay device relays the communication frame in accordance with an Ethernet standard.

11. A relay device comprising:

a plurality of ports each provides a physical layer;

a medium access controller (MAC) connected to the plurality of ports and configured to receive a communication frame from one port out of the plurality of ports and transmit the communication frame to another port out of the plurality of ports;

a relay processor configured to transmit, in cooperation with the MAC and through the MAC, the communication frame received from the MAC to another port that corresponds to destination information included in the communication frame as relay processing;

a check frame generation processor configured to generate a check frame that is a predetermined communication frame for checking operation of the relay processor;

an abnormality detection processor configured to determine whether the relay processor is operating normally based on the check frame; and a buffer configured to store the communication frame; wherein:

the relay processing includes a plurality of procedures, the relay processor performs a part or all of the plurality of procedures for the check frame, and the abnormality detection processor determines that an abnormality has occurred in the relay processor when:

(i) a pre-circulation frame that is a check frame before at least one procedure is performed mismatches with a post-circulation frame that is a check frame after the at least one procedure is performed;

(ii) the post-circulation frame is not acquired after a predetermined time has elapsed since the pre-circulation frame is acquired; or (iii) time required from the acquisition of the pre-circulation frame to the acquisition of the post-circulation frame deviates from a predetermined expected value by equal to or more than a predetermined threshold value, the relay processor is further configured to transmit, as a reception procedure, a reception frame that is the communication frame received from the MAC to the buffer, and transmit, as an output procedure, the communication frame stored in the buffer to a configuration according to a destination of the communication frame, and the relay processor (i) transmits the reception frame to the MAC according to the destination of the reception frame, and (ii) does not transmit the check frame to the MAC.

* * * * *